United States Patent [19]

Königs et al.

[11] 4,406,361

[45] Sep. 27, 1983

[54] CONNECTION CONVEYOR DEVICE FOR CONVEYING MATERIAL

[75] Inventors: Herbert Königs, Rheinberg; Heinz Weber, Krefeld-Traar, both of Fed. Rep. of Germany

[73] Assignee: Fried, Krupp Gesellschaft mit beschränkter Haftung, Essen, Fed. Rep. of Germany

[21] Appl. No.: 276,783

[22] Filed: Jun. 23, 1981

[30] Foreign Application Priority Data

Jun. 27, 1980 [DE] Fed. Rep. of Germany ....... 3024180

[51] Int. Cl.³ .................. B65G 21/10; B65G 41/00
[52] U.S. Cl. .................. 198/863; 198/588; 414/133
[58] Field of Search ............. 414/133; 198/587, 588, 198/594, 863

[56] References Cited

U.S. PATENT DOCUMENTS 1,261,179  4/1918  Stuart ........................... 198/588 X 3,358,809  12/1967  Sukurs ........................ 414/133 X

FOREIGN PATENT DOCUMENTS 1042683  9/1966  United Kingdom ............... 414/133

Primary Examiner—Harold D. Whitehead
Assistant Examiner—Douglas D. Watts
Attorney, Agent, or Firm—Becker & Becker, Inc.

[57] ABSTRACT

A connection conveyor belt device for conveying overburden or other bulk material between a belt conveyor system and a boom stacker which is coupled with the connection belt device, which has a bridge and an undercarriage. The connection conveyor device can be uncoupled from the stacker, and the bridge thereof is displaceably supported on the undercarriage by supporting means in such a way that the supporting point can occupy every position of the range which extends approximately from the center of gravity to the receiving end of the bridge, and that the bridge is securable against tilting in the center of gravity position.

5 Claims, 4 Drawing Figures

CONNECTION CONVEYOR DEVICE FOR CONVEYING MATERIAL

The present invention relates to a connection conveyor belt device for conveying overburden and the like, between a belt conveyor system and a boom stacker which is coupled to the connection conveyor belt device comprising a bridge and an undercarriage.

With the known systems for backfilling overburden and the like onto a waste dump, which systems are provided with a conveyor belt system—as a rule a shiftable belt conveyor with a travelling tripper discharging onto a connection conveyor belt device—and a boom stacker provided with a caterpillar drive, the boom stacker is the most highly stressed of all these devices. Accordingly, the boom stacker fails more frequently than do the other devices. Such a breakdown, however, simultaneously means the standstill of the entire system.

It is an object of the present invention to provide a remedy for such a situation.

This object, and other objects and advantages of the present invention, will appear more clearly from the following specification in connection with the accompanying drawings, in which.

The connection conveyor device of the present invention is characterized primarily in that it can be uncoupled from the boom stacker, and that the bridge thereof is displaceably supported on the undercarriage by supporting means in such a way that the supporting point can occupy every position of the range which extends approximately from the center of gravity to the receiving end of the bridge, and that the bridge can be secured against tilting or pivoting in the center of gravity position. Consequently, it is possible to have the connection conveyor belt device, at least temporarily, function as stacker.

The present invention has the further advantage that the novel connection conveyor device can also be used for preparing an operating surface for the boom stacker before putting the same to work, which saves the use of further transporting means, including for instance trucks, as well as time. Additionally, a boom stacker of known construction requires an essentially wider bank or level floor, with for instance a head width of approximately 50 meters, whereas the inventive connection conveyor device used for depositing needs only a head width of approximately 30 meters.

The additional expenditure for the design of the novel device for depositing overburden or the like is small compared with the cost for the known connection conveyors.

According to further advantageous features of the present invention, a pivot mounting, preferably a ball-bearing slewing gear, may be arranged between the undercarriage and the supporting means. The bridge in the dumping or depositing position may be connectible with the undercarriage, for securing against tilting, by a connection element arranged preferably between the supporting point and the discharge end. The connection element may be capable of being telescoped. Two wheel-balancing devices may be provided as supporting means of the bridge, and at the discharge end of the bridge there may be provided an upwardly projecting arm for providing a spherical or Cardanic bearing or support connection with a boom stacker.

Figure 1:
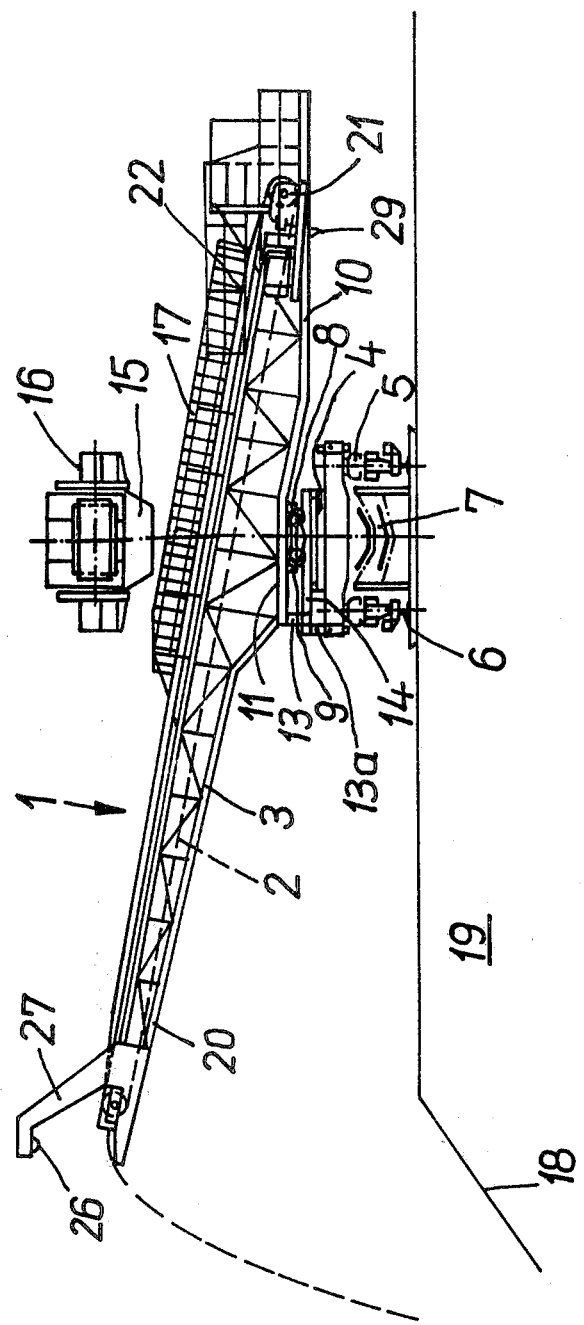
FIG. 1 shows a view of a connection conveyor belt device according to one embodiment of the present invention in position for depositing.
Figure 2:
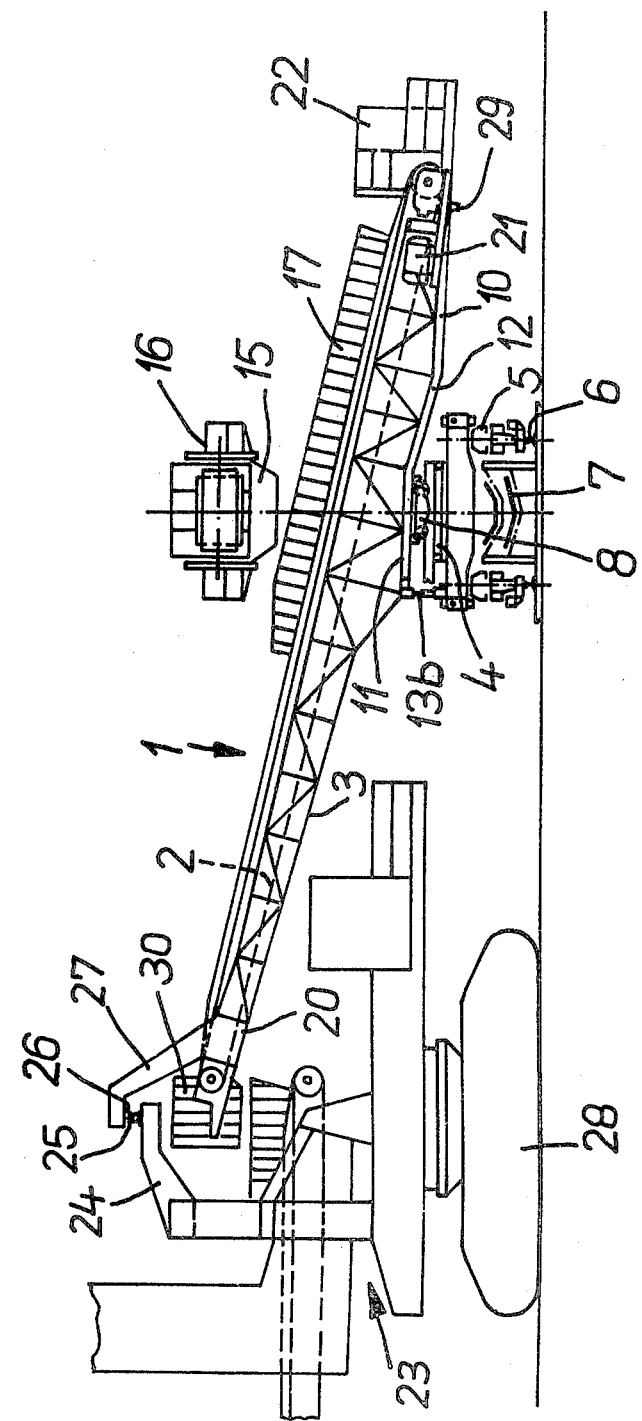
FIG. 2 shows the device during coupling thereof to a partially illustrated boom stacker.

Referring now to the drawings in detail, the connection conveyor belt device 1 as shown by FIG. 1 comprises a bridge 3 with a conveyor belt 2; the bridge 2 is connected to an undercarriage 5, embodied as a portal or gantry, by way of a pivot mounting embodied as a ball-bearing slewing gear 4; the undercarriage 5 runs on the rails 6 of a shiftable belt conveyor 7. The upper part of the ball-bearing slewing gear 4 is provided with two wheel-balancing devices 8 serving as supporting means, the wheels 9 of which are supported against two shuttle booms or shift supports 12 forming two steps 10 and 11 and respectively arranged externally on the underside of the bridge 3 (FIG. 2). In the illustrated depositing position of FIG. 1, the point of suspension or support is located approximately below the center of gravity of the bridge 3, in which connection the wheel-balancing devices 8 engage the approximately horizontally extending upper step 11 located in this position.

In the depositing position illustrated in FIG. 1, the bridge 3 is rigidly connected by a connection element 13 with a projecting arm 14 arranged on the upper part of the ball-bearing slewing gear 4. The connection element 13, which may also be telescopable for an adjustment of the inclination of the bridge 3, is located on one of the outer sides of the undercarriage 5 in the region of the particular rail 6 relative to which the bridge 3 is located transversely toward one or the other side. If necessary, a further connection element 13a may be provided which connects the arm 14 with the undercarriage 5.

The overburden or other bulk material arrives at the conveyor belt 2 via the discharge chute 15 of a travelling tripper 16, which is movable on the rails 6 and with which the undercarriage 5 is coupled, and via a chute 17, and is dumped at the slope or embankment 18 of the tank 19. The discharge end 20 of the bridge 3 is located higher and projects out farther than the receiving end 22, which is provided with the belt drive 21 and the chute 17 extending approximately as far as to the center of gravity of the bridge.

Figure 3:
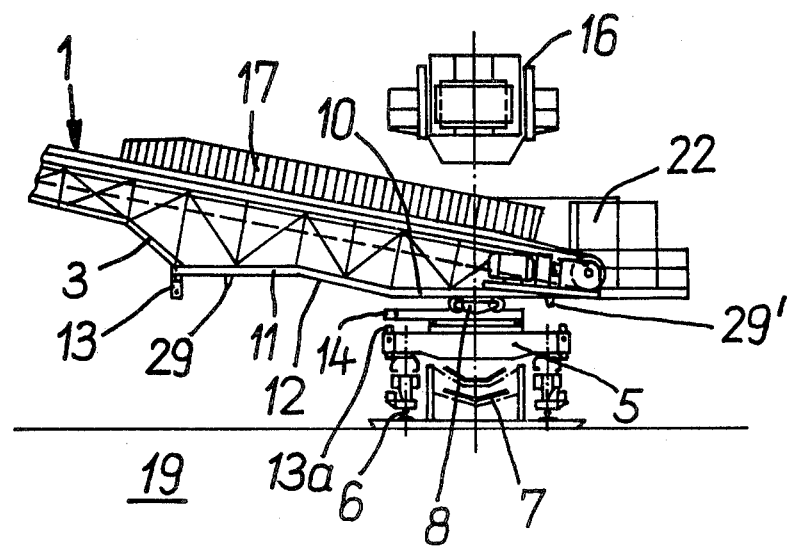
FIG. 3 shows the lower part of the device in the operating position as a connection conveyor.

For coupling the connection conveyor belt device 1 to the pertaining boom stacker 23, as shown in FIG. 2, the discharge end 20 of the bridge 3 is first lifted by the intervention of a telescopable connection element 13b, or other non-illustrated presses, so that the stacker 23 can advance until its swinging platform or cantilever 24, which is provided with a ball-like support 25, aligns with the corresponding support 26 of an upwardly projecting arm 27 of the bridge 3, whereupon the connection is made by lowering the bridge. After coupling has thus been accomplished and after release of the connection element 13, 13a, or 13b, the stacker 23 moves by means of its caterpillar drive 28 transversely to the shiftable belt conveyor 7 and away therefrom, consequently pulling the bridge 3 into its position as a connecting element between the shiftable belt conveyor and the stacker. This position is reached when the lower steps 10 of the shuttle booms 12 rest on the wheel-balancing devices 8 as illustrated in FIG. 3. The uncoupling of the connection conveyor belt device 1 from the stacker 23 occurs in reverse sequence. A discharge chute 30 fastened to the discharge end 20 of the bridge 3 remains suspended on the cantilever 24 after the uncoupling.

The spherical placing of the bridge 3 upon the cantilever 24 of the stacker 23, and the longitudinally movable support, limited by means of inner and outer end contacts 29 and 29', by way of the wheel-balancing devices 8 and the ball-bearing slewing gear 4 on the undercarriage 5, make the boom stacker 23 freely movable over a wide range. The dumping height of the discharge chute 15 can be kept small due to stepping of the shuttle boom 12. The manner of the spherical placement of the bridge 3 on the cantilever 24 additionally brings about that also tilting or rocking movements of the superstructure of the stacker 23 are possible without restraint, and simultaneously a large pivot angle is made possible between stacker 23 and bridge 3.

Figure 4:
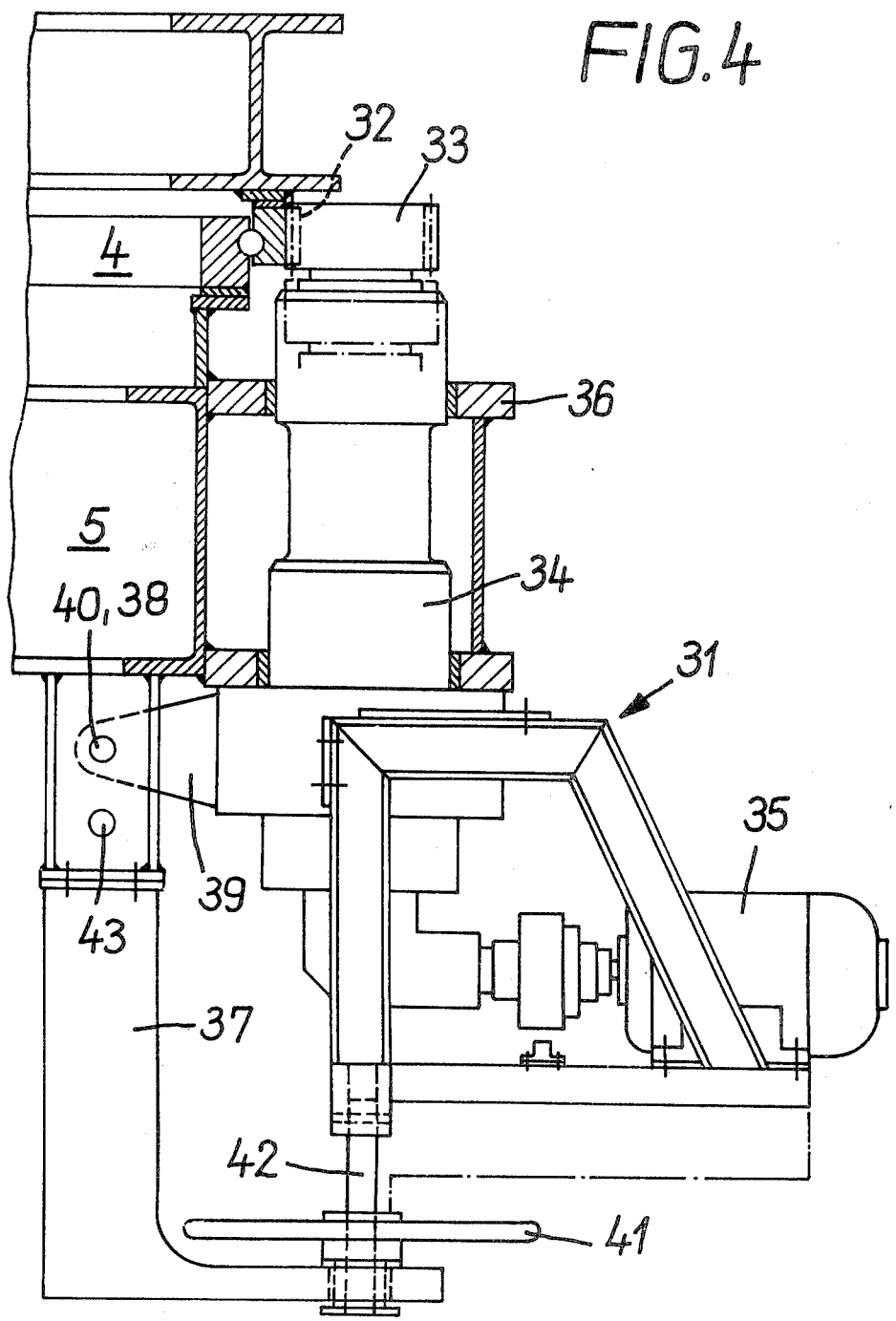
FIG. 4 is a partially sectioned view of a disconnectable or releasable pivot drive of the pivot mounting of the bridge support.
Figure 5:
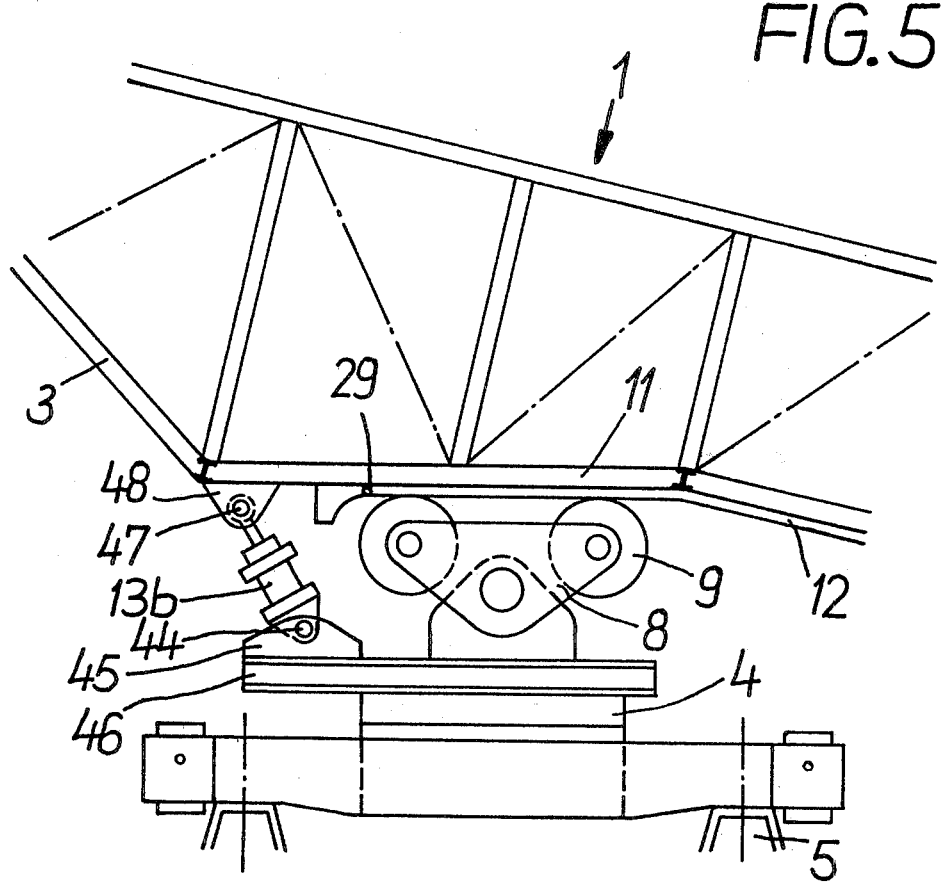
FIG. 5 is an enlarged fragmentary view showing a telescopable connection element according to structure of FIGS. 1 and 2.

FIG. 4 shows a preferred embodiment of a disconnectable drive 31 for the ball-bearing slewing gear 4. This drive is so embodied that a pinion or bevel gear 33 engaging in an outer toothed gear 32 of the upper part of the ball-bearing slewing gear 4 is axially shiftably connected with the drive 31. This is attained thereby that a known planetary bevel gear 34 with a flanged-on drive motor 35 is vertically shiftably mounted in a console or bracket 36 fastened to the undercarriage 5. A torque support 39 of the bevel gear 34 is provided with a bore 38 and engages in a supporting fork 37 arranged on the undercarriage 5, and simultaneously retains the bevel gear in its height position by means of an insert bolt or pin which is drawn through a bore 40 in the supporting fork 37 and through the bore 38. The pin or bolt is removed from the bore 40 for uncoupling the pinion 33, and a handwheel 41 is rotated which displaces the bevel gear 34 axially downwardly by means of a spindle 42 until the uncoupling position is reached, in which the bore 40 is aligned or flush with a bore 43 in the supporting fork 37; the securing of this position occurs again by insertion of the pin into the bores 40 and 43. The coupling of the drive 31 of the ball-bearing slewing gear 4, making possible the free pivoting of the bridge 3 in its function as a connection element, can also occur in a different manner, for instance by swinging or pivoting away the pinion 33. The pivot drive 31 can be eliminated if the bridge 3 need not be swung or pivoted during depositing.

The present invention is, of course, in no way restricted to the specific disclosure of the specification and drawings, but also encompasses any modifications within the scope of the appended claims.

What we claim is:

1. A connection conveyor device for conveying material to a stacker, said device comprising:
    an undercarriage;
    a bridge having a material receiving end and a material discharge end;
    a conveyor belt system provided on said bridge for effecting said conveying;
    supporting means interposed between said undercarriage and said bridge for displaceably supporting said bridge on said undercarriage at any location of said bridge extending approximately from the center of gravity thereof to said receiving end thereof, and for securing said bridge against tilting, when in the center of gravity position, said connection conveyor device being adapted to be selectively coupled and uncoupled from said stacker, and a connection element for connecting said bridge to said undercarriage, when said bridge is in a discharge position, to secure said bridge against tilting, said connection element being arranged between the support location of said bridge and said discharge end of said bridge.

2. A connection conveyor device for conveying material to a stacker, said device comprising:
    an undercarriage;
    a bridge having a material receiving end and a material discharge end;
    a conveyor belt system provided on said bridge for effecting said conveying;
    supporting means interposed between said undercarriage and said bridge for displaceably supporting said bridge on said undercarriage at any location of said bridge extending approximately from the center of gravity thereof to said receiving end thereof, and for securing said bridge against tilting, when in the center of gravity position, said connection conveyor device being adapted to be selectively coupled and uncoupled from said stacker, and a connection element for connecting said bridge to said undercarriage, when said bridge is in a discharge position, to secure said bridge against tilting, said connection element being telescopable.

3. A device according to claim 1, which includes a pivot mounting arranged between said undercarriage and said supporting means.

4. A device according to claim 3, in which said pivot mounting is a ball-bearing slewing gear.

5. A device according to claim 2, in which said supporting means comprises two wheel-balancing devices, and in which said discharge end of said bridge is provided with an upwardly projecting arm which provides a support connection with said stacker.

* * * * *